United States Patent
Brandt et al.

(10) Patent No.: US 6,468,182 B1
(45) Date of Patent: Oct. 22, 2002

(54) METHOD OF CONTROLLING A GEAR-SHIFTING PROCESS

(75) Inventors: Martin Brandt, Thalmassing; Gunter Hirt, Seebach, both of (DE)

(73) Assignee: LuK Lamellen und Kupplungsbau Beteiligungs KG, Buhl/Baden (DE)

( * ) Notice: Subject to any disclaimer, the term of this patent is extended or adjusted under 35 U.S.C. 154(b) by 23 days.

(21) Appl. No.: 09/680,830

(22) Filed: Oct. 6, 2000

(30) Foreign Application Priority Data

Oct. 6, 1999 (DE) .......................... 199 48 300

(51) Int. Cl.$^7$ .............................................. F16H 63/50
(52) U.S. Cl. ..................... 477/98; 477/107; 477/906
(58) Field of Search .................... 477/98, 107, 109, 477/76, 906; 74/335, 339

(56) References Cited

U.S. PATENT DOCUMENTS

| | | | |
|---|---|---|---|
| 5,119,695 A | * | 6/1992 | Milunas et al. ............. 477/154 |
| 5,307,269 A | * | 4/1994 | Kohno ..................... 192/82 T |
| 5,593,364 A | * | 1/1997 | Ishii et al. ..................... 477/98 |
| 5,823,912 A | * | 10/1998 | Fischer et al. ............ 192/82 T |
| 5,997,433 A | * | 12/1999 | Domian et al. ............ 192/3.58 |

FOREIGN PATENT DOCUMENTS

GB        2348255 A   *   9/2000

\* cited by examiner

Primary Examiner—Charles A. Marmor
Assistant Examiner—Ankur Parekh
(74) Attorney, Agent, or Firm—Darby & Darby

(57) ABSTRACT

In a power-shift transmission that is coupled to the engine of a vehicle and uses a frictional slip clutch as a power-shift clutch, the gear-shifting process is controlled under a method wherein the torque generated by the engine and the clutch torque transmitted through the frictional slip clutch are varied in such a manner that the temperature rise of the frictional slip clutch is lessened.

22 Claims, 2 Drawing Sheets

METHOD OF CONTROLLING A GEAR-SHIFTING PROCESS

BACKGROUND OF THE INVENTION

The present invention relates to a method of controlling a gear-shifting process in a power-shift transmission of a vehicle, wherein the power-shift transmission is coupled to an engine and uses a frictional slip clutch as a power-shift clutch.

To change gears in known manually shifted transmissions, e.g., for passenger cars, it is necessary to interrupt the flow of tractive force from the combustion engine to the drive train of the vehicle, e.g., by disengaging a start-up element such as a friction clutch, where the disengagement can he performed either by the driver of the vehicle or by an actuator. The time gap in vehicle traction is noticeable for the user of the vehicle at every gear change. The interruption in traction occurs also in automated transmissions in which the gear-shifting process is performed by means of an actuator. While there are known transmissions that can be shifted while traction is maintained (also known as power-shift transmission s), the state-of-the-art units are primarily automatic transmissions of a planetary-gear design. Although they are practically proven, they are complex and therefore expensive.

To make the gear-shifting process in vehicles more comfortable, the known state of the art also offers a power-shift transmission in the form of a so-called interruption-free gear-shift transmission. This interruption-free transmission, like conventional transmissions, includes a start-up element such as a friction clutch, but in addition, a frictional slip clutch on either the input or output shaft of the transmission is arranged in a such a manner that an engine torque acting on the transmission-input shaft in the engaged condition of the start-up clutch is transmitted through the frictional slip clutch to the transmission-output shaft, whereby it becomes possible to transmit torque also while a gear-change of the transmission is in process. In other words, the flow of traction from the engine to the drive train of the vehicle is maintained during the gear change.

It has been found that the increase in vehicle comfort achievable with an interruption-free transmission of this kind depends to a great extent on the characteristics of the additional frictional slip clutch, which will be referred to as power-shift clutch. Especially when shifting gears under full traction, the heat load on the power-shift clutch is very high, because to a large extent, a transmission of this kind has to be able to transmit the entire engine torque to the drive train of the transmission, if an interruption in traction is to be avoided. Otherwise, a time-gap in the tractive force could be noticed by the driver of the vehicle during a phase of full acceleration when the full amount of driving torque is delivered by the engine.

The heat load on the power-shift clutch becomes greater if the power-shift clutch is arranged to be effective with a higher gear of the power-shift transmission. For example, if the power-shift transmission has five forward gears, the heat load on the power-shift clutch is greater if the power-shift clutch is arranged to be effective with the fifth gear of the transmission than if it were arranged to act on the fourth gear. However, it is desirable in a transmission of this kind that the power-shift clutch be effective in fifth gear because otherwise a shift from fourth into fifth gear could no longer be performed under traction and would therefore be accompanied by an interruption of the tractive force. However, in order to achieve a high degree of durability of a power-shift clutch that is configured as a frictional slip clutch, it is necessary to avoid a thermal overload of the power-shift clutch.

OBJECT OF THE INVENTION

The present invention therefore aims to provide a method of controlling a gear-changing process of a power-shift transmission, whereby the heat load on the power-shift clutch is reduced in order to make the power-shift transmission more durable.

SUMMARY OF THE INVENTION

The invention is based on the observation that the gear-shifting process in a power-shift transmission is influenced to a high degree by the clutch torque that is transmitted through the power-shift clutch. The clutch torque affects all of the following: a) the amount of output torque delivered to the drive train of the vehicle during the gear-shifting process, b) the amount of time needed for synchronization and thus the time required for the gear-shifting process, c) the amount of heat generated in the power-shift clutch due to the slipping engagement, and d) the amount of power transmitted through the power-shift clutch. Although it is possible, in principle, to influence the output torque during the entire gear-shifting process by way of the clutch torque flowing through the power-shift clutch, a process of controlling the output torque by way of the clutch torque leads to a large accumulation of energy in the power-shift clutch in the form of heat that is generated by the frictional slip of the power-shift clutch. Albeit that in a power-shift clutch designed as a frictional slip clutch with two or more friction linings or as a laminar-disc clutch with a plurality of friction linings, the heat can be carried away by convection, radiation, or heat conduction into the pressure plate and the disc or discs of the clutch, the power-shift clutch is nevertheless subjected to a high heat load if power-shift processes are performed in rapid succession so that no effective temperature reduction of the power-shift clutch can take place between the individual power-shifts.

The present invention solves the foregoing problem by providing an advantageous method of controlling the gear-changing process, whereby the amount of energy introduced into the power-shift clutch can be lessened. The method also has a favorable effect on the fuel consumption of a vehicle equipped with a power-shift transmission, but has no negative consequences on the desired shifting comfort in the interruption-free power-shift processes.

Under the method according to the invention, a gear-changing process in a power-shift transmission coupled to an engine and equipped with a frictional slip clutch works in a manner where the engine torque as well as the clutch torque are being varied in such a way that the amount of heat introduced into the frictional slip clutch is lowered and, consequently, the temperature increase of the frictional slip clutch is reduced. In other words, in the gear-changing process that is performed as a power-shift process, the inventive method provides that the engine torque as well as the clutch torque are being varied and that the variation is performed in a manner where the amount of energy introduced into the power-shift clutch and converted into heat is reduced in comparison to a gear-changing process where only the clutch torque of the power-shift clutch is being varied and the torque produced by the engine remains, at least to a large extent, constant during the gear-changing process.

In a first phase of the gear-shifting process according to the inventive method, the torque entering the drive train of the vehicle is reduced by lowering the engine torque while the gear clutch of the current gear level is still engaged. Thus, at the beginning of a power-shift process, the torque level is lowered at first by an intervention of the engine control system rather than by using the power-shift clutch. The power-shift clutch is therefore in the disengaged condition and not transmitting any torque at the beginning of the shift process. Because the power-shift clutch uses a slipping engagement to transmit torque between the input shaft and the output shaft of the power-shift transmission, a transmission of torque through the power-shift clutch will cause the latter to heat up. However, at the beginning of the power-shift process according to the inventive method, the output torque is lowered by controlling the engine torque, so that there is no load on the power-shift clutch, and thus no energy is introduced in the power-shift clutch, during the corresponding time phase of the power-shift process.

As a next step after the first reduction of the output torque that has just been described, the power-shift clutch is brought into engagement, so that a clutch torque will flow through the power-shift clutch. The purpose of the power-shift clutch is to prevent an interruption in the flow of tractive force from the engine to the drive train of the vehicle during the gear-shifting process. The clutch torque transmitted by the power-shift clutch cannot be increased abruptly, because the comfort level of the shifting process is determined by the time gradients of the clutch torque. Consequently, the engagement of the power-shift clutch, and thus the magnitude of the clutch torque, is increased gradually during this second step. In the course of this process, the reduction of the output torque is continued, while the engine torque is simultaneously raised again. The increase in engine torque, e.g., to the maximum torque level of which the engine is capable, has the result that with full acceleration of the vehicle under maximum engine torque or also with a lower amount of engine torque, the driver of the vehicle will experience no interruption in traction when the currently used gear-stage is shifted out of engagement. Because the clutch torque during this phase of the gear-changing process is raised to a level that is at least equal to the engine torque, the slippage between the friction surfaces of the power-shift clutch is relatively high. It is therefore advantageous if the time needed for equalizing the clutch torque and the engine torque is kept short. In accordance with a further developed version of the method, the gear clutch of the current gear stage can be taken out of engagement as soon as the engine torque and the clutch torque have been found to be substantially equal.

To allow the gear clutch to be retracted from engagement as rapidly as possible, it is advantageous if an actuator applies a retracting force to the gear clutch already before the engine torque and the clutch torque have become substantially equal, so that the currently used gear stage can be disengaged as soon as the torque passing through the gear clutch of the currently used gear has fallen below a preset threshold level, whereby the time for the disengaging process can be kept short. The disengaging process can be monitored, e.g., by observing the number of revolutions of an actuator motor.

After the disengaging process has been completed and prior to bringing the new gear stage into engagement, the process of synchronization takes place, during which the output torque is determined exclusively by the clutch torque transmitted through the power-shift clutch. It has therefore proven to be advantageous if, in accordance with the inventive method, the engine torque is lowered for the synchronization and the clutch torque is adjusted in such a way that the output torque corresponds to an output torque level that will be present after the gear-shifting process.

Because during the synchronization phase, the previously used gear stage has already ceased to transmit torque and the new gear stage to be engaged is not yet transmitting torque, the output torque during the synchronization phase is determined by the clutch torque that flows through the power-shift clutch. To shorten the synchronization time, it is therefore of advantage if the engine torque is lowered to a minimum level as rapidly as the engine control system will permit.

Therefore, to shorten the synchronization time, a further developed version of the inventive method provides that after the previously used gear stage has been disengaged, the engine is set to a drag-torque level, to shorten the time during which the engine continues to run under its own momentum. As the engine is set into the drag mode, the rpm rate of the engine and transmission input shaft is lowered and the synchronization process is accelerated, whereby the amount of energy accumulated in the power-shift clutch during the synchronization phase is reduced. This approach, whereby the engine is set into the drag mode as rapidly as possible, requires an engine with an appropriately fast response. With a combustion engine that does not allow a rapid change into the drag mode, it is advantageous for the purpose of shortening the synchronization time if the clutch torque is increased above the maximum engine torque, so that the rpm rate of the engine and the input shaft of the transmission is lowered. The increased clutch torque actively decelerates the engine against the drive train, so that by increasing the clutch torque above the maximum engine torque, the synchronization time is shortened and the accumulation of energy taking place in the power-shift clutch during the synchronization phase is again reduced.

According to a further developed version of the method, after the synchronization has essentially been completed, the clutch torque and the engine torque are being set to substantially equal levels. The gear clutch of the new gear is brought into engagement at a point when the rpm rate and acceleration of the input shaft and output shaft of the power-shift transmission are substantially equal. During this engagement phase, the slippage-rpm rate of the power-shift clutch is low, and the clutch torque corresponds, at least to a large extent, to the engine torque, so that only a small amount of energy is introduced into the power-shift clutch. When the gear clutch of the new gear stage has come into engagement, the power-shift clutch is removed from engagement and the clutch torque is thereby lowered. The disengagement of the power-shift clutch has to be performed according to a time gradient that agrees with specified requirements of driving comfort, as the power-shift clutch continues to transmit torque and, e.g., an abrupt disengagement of the power-shift clutch could cause a discontinuity of the output torque in the drive train of the vehicle, which would be felt by the occupants as a jolt.

The inventive method further provides that the temperature of the frictional slip clutch be monitored in order to avoid a heat overload. During a power-shift, the friction-based transmission of torque causes an energy influx and conversion of energy into heat in the power-shift clutch. At least part of the heat is carried away by convection, radiation, or heat conduction into the clutch plate and the disc, but if a series of power-shifts is performed in short time intervals, the temperature of the power-shift clutch will rise because there is not enough time for the heat to escape. A thermal overload can cause mechanical damage to the power-shift clutch.

The invention therefore provides that, when a temperature limit of the frictional slip clutch has been found to be exceeded, the clutch torque is lowered in function of the temperature. The reduced clutch torque will still allow a power-shift to be performed but will cause a reduction in the comfort level of the shift process. This condition of the vehicle that is equipped with the power-shift transmission is also communicated to the driver by way of the decreased comfort level because, as a rule, an excessive temperature of the power-shift clutch occurs only if the driver is not operating the vehicle in conformance with prescribed procedure. For example, if the driver uses the gas pedal in a way that causes a rapid succession of up- and down-shifts in the lower gears at full traction and high engine-rpm rate, the decrease in the level of driving comfort will alert him or her of their unsound style of driving.

In accordance with a further developed version of the method, the power-shift transmission is being prevented from down-shifting into first gear, if the frictional slip clutch temperature has been found to be too high. Because of the large step between the transmission ratios of first and second gear, a power-shift from first into second gear is especially prone to cause a high thermal load on the power-shift clutch. A further temperature rise of the power-shift clutch due to power-shifting under traction from first into second gear is therefore avoided by the measure of blocking the down-shift into first gear.

The inventive method further provides that, if the friction-clutch temperature has been found to be too high, the frictional slip clutch is kept disengaged during the synchronization phase, so that no torque is transmitted. While this measure will noticeably reduce the comfort level of the shifting process because of the total interruption of the tractive force, it prevents damage that would be caused to the power-shift clutch by a temperature that has been found to exceed the permissible level by a clear margin. This measure is proposed in light of the fact that a temperature of the required excessive level cannot occur if the vehicle with the power-shift transmission is used according to prescribed procedure, but will only be caused by an incorrect behavior of the driver who will experience a complete loss of traction during the shift process and thereby be alerted to his or her inappropriate style of driving.

Another further developed version of the inventive method provides that, after the frictional slip clutch has been found to be too hot, preset rpm-rates for the gear changes of the power-shift transmission are lowered in order to reduce the amount of energy that is introduced into the power-shift clutch. It needs to be mentioned that the foregoing measures that are taken after finding an excessive temperature of the frictional slip clutch can be applied alternatively or also in combination, dependent on the extent to which the temperature exceeds a permissible level.

The invention further provides the measure of monitoring the power transmitted through the frictional slip clutch and lowering the clutch torque, e.g., to the level of the maximum engine torque, if a preset maximum power level has been found to be exceeded so that, for example during the synchronization phase, the clutch torque is no longer being raised above the magnitude of the engine torque, whereby damage to the power-shift clutch can be safely prevented. This measure allows to avoid damage to the power-shift clutch even before an excessive temperature of the power-shift clutch can be registered.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DETAILED DESCRIPTION OF THE INVENTION

During the time phases when the friction-based power-shift clutch transmits a torque between the input shaft and the output shaft of the power-shift transmission and thereby prevents the occurrence of a noticeable gap in the tractive force flowing to the drive train of the vehicle, the power-shift clutch is in a slip mode and transmits torque by means of friction. This friction-based transmission of torque causes the power-shift clutch to heat up. In the most general terms, the energy that is thereby introduced into the power-shift clutch is a function of the length of time used for the synchronization process, the magnitude of the torque acting on the power-shift clutch, and the rpm-differential between the parts that interface with each other in slipping friction. The synchronization time, in turn, is a function of the difference between the engine torque and the clutch torque during the synchronization phase.

Figure 1:
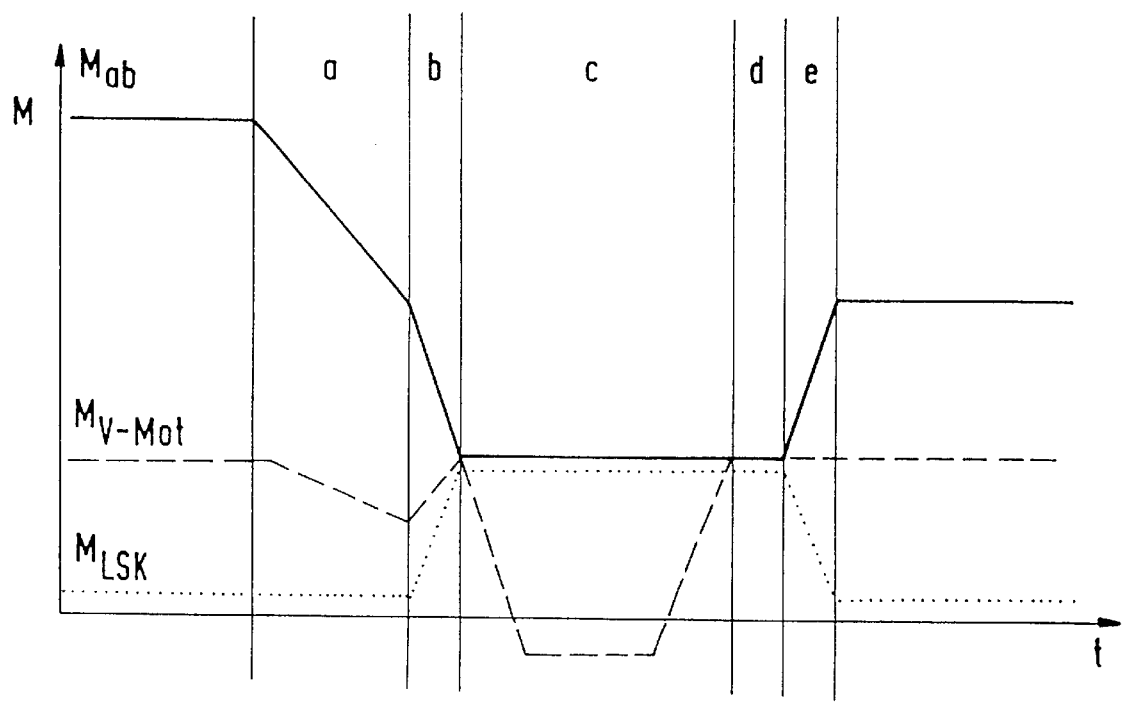
FIG. 1 represents the respective time profiles of the output torque, engine torque, and clutch torque over the different time phases of the gear-changing process according to an embodiment of the inventive method.

FIG. 1 of the drawing illustrates a time profile of an output torque $M_{ab}$ acting on the drive train of a vehicle that is equipped with a power-shift transmission in which the gear-changing process is controlled in accordance with the method of the present invention. Also shown in the graph of FIG. 1 are the engine torque $M_{V\text{-}Mot}$ and the clutch torque $M_{LSK}$ of the power-shift clutch. All of the three torques are represented as functions of time during a gear-changing process with uninterrupted traction. The gear-changing process of FIG. 1 is subdivided into individual phases from a to e. The gear-changing process can be a completely or partially automated shift process of an interruption-free gear-shift transmission. With a given output torque $M_{ab}$, the shift process can be initiated when a certain preset rpm rate has been reached that is based on the torque characteristics of the engine. The gear-changing process discussed here is an up-shift under traction, e.g., a change from the first to the second gear stage of the power-shift transmission.

At the beginning of the power-shift process, i.e., in phase a, the output torque is lowered with the help of the engine control system while the gear clutch of the currently used gear remains engaged. The torque is lowered with a time gradient that is comfortable for the driver of the vehicle. During phase a, the power-shift clutch remains disengaged and transmits no torque. Accordingly, there is no torque-related heat load on the power-shift clutch during phase a.

If one were to use a less advantageous strategy, however, by adjusting the output torque through a combination of an engine-control measure and an increase of the clutch torque of the power-shift clutch, there would be a state of maximum slip at the friction interface of the power-shift clutch during phase a, whereby a large amount of energy with a commensurately high heat load would be introduced to the power-shift clutch, which is a situation to be avoided. This is why, according to the invention, the output torque is reduced at the beginning of the gear-changing process by lowering the engine torque.

Phase a is followed by phase b, during which the lowering of the output torque is continued. However, in order to maintain traction during the gear-changing process, the power-shift clutch is at this point brought into engagement. In a shift process under full load, where the level of traction is either maintained or only insignificantly reduced, a comfortable shifting experience can be achieved for the driver, if the available engine torque is raised to a maximum level. This increase of the engine torque is performed during phase b. The clutch torque of the power-shift clutch is also increased at the same time, because the engine torque and the clutch torque have to be equalized to allow the current gear to be taken out of engagement.

Thus, according to the inventive method, the power-shift clutch remains inactive during the beginning phase of lowering the output torque and is brought into play only after the output torque has already been significantly lowered by a control-measure in the engine. At the point where the engine torque and the clutch torque are at about the same level, the gear clutch of the currently used gear can be taken out of engagement. This occurs at the beginning of phase c. To allow the disengagement to be performed as rapidly as possible, a retracting actuator force is applied to the gear clutch or more specifically, to its sliding sleeve, already in phase b in order to assure that the gear clutch will be retracted from engagement as soon as the torque transmitted through the gear clutch has fallen below a threshold level. The disengaging process can be monitored, e.g., by observing the number of revolutions of the actuator motor.

The synchronization of the engine and transmission takes place during phase c. The previously used gear stage is already out of engagement, and the new gear stage in not yet engaged, so that during phase c the output torque acting on the drive train of the motor vehicle is determined exclusively by the clutch torque transmitted through the power-shift clutch. To keep the amount of energy small that is accumulated and converted into heat by the power-shift clutch, it is advantageous if the engine torque during the synchronization process is brought down to a very low level as rapidly as possible. It is especially advantageous to rapidly set the engine into the engine-brake mode, also called drag mode, during the synchronization process. This condition can be achieved in a very short time through a command to the engine control system. As the engine is set into the drag mode, the rpm rate of the engine and transmission input shaft is lowered and the synchronization process is accelerated, whereby the amount of energy accumulated in the power-shift clutch and the resultant increase in temperature during the synchronization phase are kept small. With a combustion engine that does not allow a rapid change into the drag mode, i.e., in an engine of inferior dynamic behavior, it can be advantageous if during synchronization, the clutch torque of the power-shift clutch is increased above the maximum engine torque, so that the time interval in which the engine continues to run under its own inertia is shortened. The increased clutch torque actively decelerates the engine against the drive train, whereby the synchronization time is again shortened and, as a consequence, the accumulation of energy taking place in the power-shift clutch during the synchronization phase is again reduced. With the foregoing procedure, it needs to be kept in mind, however, that raising the clutch torque above the maximum engine torque can cause an increased heat load on the power-shift clutch, a condition that can be detected by monitoring the temperature of the power-shift clutch.

After the rpm rate required for engaging the new gear stage has been substantially met, the gear clutch of the new gear is brought into engagement at the point where the mating elements have equal rpm- and acceleration rates. To reach this point, the engine torque is matched to the clutch torque, as illustrated by the end of phase c in FIG. 1. Because the engine torque and the clutch torque are at the same level and the slippage-rpm rate of the power-shift clutch is low, the amount of energy accumulating in the power-shift clutch during the gear-engagement phase is kept small.

After the engagement of the new gear stage has been completed, the power-shift clutch is taken out of engagement at a rate that agrees with specified comfort requirements, i.e., the clutch torque is lowered at a given comfortable time gradient, noting however that the disengagement should be performed at the fastest possible rate as the power-shift clutch continues to transmit torque and is thus in a heat-generating slip condition.

Because the power-shift clutch is subjected to a heat load during the entire time when a torque is transmitted, it is advantageous to monitor the temperature of the power-shift clutch. This function can be performed, e.g., by way of temperature sensors or also by means of a temperature model in which the real-time temperature levels of the power-shift clutch are determined mathematically.

Figure 2:
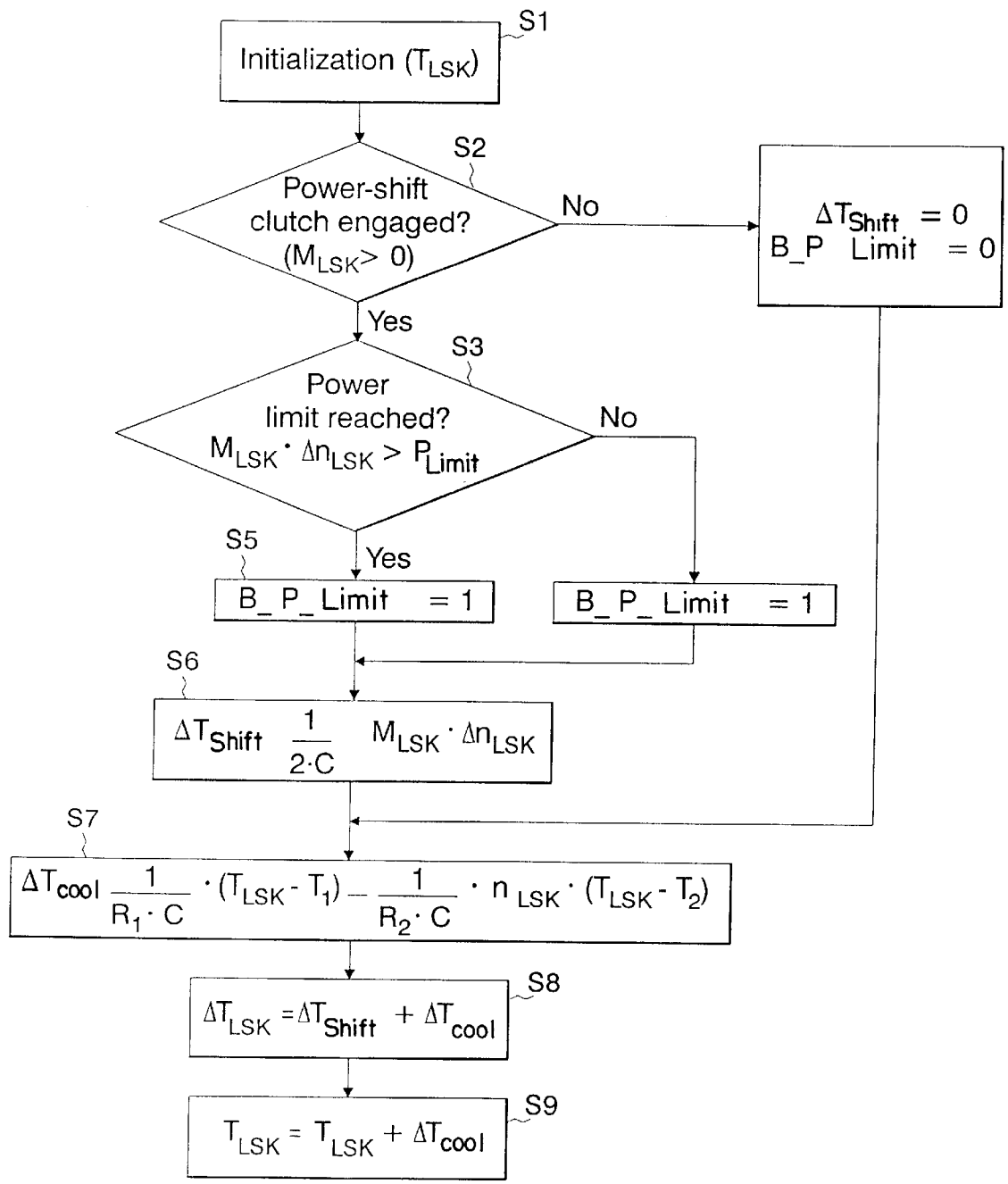
FIG. 2 represents a flow-diagram for a process of monitoring the temperature of the power-shift clutch.

With a mathematical determination of this kind, the initial reference temperature can be based on the coolant temperature or the oil temperature at the time of starting the vehicle. This value is used as a starting temperature value to initialize the program that determines the temperature $T_{LSK}$ of the power-shift clutch. The flow-chart of FIG. 2 illustrates the process of determining the temperature of the power-shift clutch.

The initializing step S1 is followed by the step of detecting (step S2) whether the power-shift clutch is in an engaged condition, i.e., in a state of slipping friction. Step 2 can be performed, e.g., by checking whether the torque $M_{LSK}$ transmitted through the power-shift clutch is greater than zero.

If the answer in step S2 is yes, the program flow passes on to step S3 where a test is made whether the power limit, i.e., the maximum permissible power that can be transmitted, has been reached in the power-shift clutch, so that an immediate cut-back of the clutch torque, e.g., to the level of the maximum engine torque, would be required to prevent damage to the power-shift clutch.

If the answer in step S2 is no, the program flow passes on to step S4 where a temperature variable $T_{shift}$ is set to zero and a binary flag, i.e., a bit variable B_P_Limit, is set to zero to indicate that the power limit has not been reached.

In step S5, the bit variable B_P_Grenze is set to 0 or 1, respectively, depending on whether or not the power limit of the power-shift clutch has been reached.

In step S6, the temperature rise $\Delta T_{shift}$ due to the shift process is calculated based on the clutch torque $M_{LSK}$, the slip-rpm rate of the power-shift clutch, and the heat capacity C.

In step S7, the temperature loss components, i.e., the cooling by convection, radiation or heat conduction are taken into account and combined into a temperature differential $\Delta T_{cool}$. Thus, in step S8, the net temperature change $\Delta T_{LSK}$ of the power-shift clutch is obtained by subtracting the temperature loss $\Delta T_{cool}$ from the temperature gain $\Delta T_{shift}$. Subsequently, in step S9, the current temperature $T_{LSK}$ of the power-shift clutch is determined by adding the net temperature change $\Delta T_{LSK}$ to the temperature change $T_{LSK}$ that existed before the shift process.

If the presence of an excessively high temperature has been established through the sequence of measures illustrated in the flow chart of FIG. 2, different responses to the situation are possible, depending on the amount by which the temperature exceeds the permissible limit.

As one possibility, the maximum torque acting on the power-shift clutch during the gear-changing process can be lowered, e.g., by a temperature-dependent cut-back of the maximum clutch torque to the level of the maximum engine torque, and by performing the synchronization without raising the clutch torque. While this procedure still allows the gear-changes to be performed under traction, there will be a reduction in the comfort level, because the output torque is lowered during the synchronization. The driver of a vehicle that is equipped with a power-shift transmission of this type will notice the reduced comfort level and can correct the situation by adjusting his or her style of driving. Another possible response to an excessive temperature level of the power-shift clutch is blocking a down-shift from second into first gear, because the subsequent up-shift from first to second gear would cause a maximum amount of energy accumulation in the power-shift clutch due to the fact that the change from first to second gear represents the largest step in transmission-ratio.

Another possible response after registering a significant transgression of the temperature limit is to perform up-shifts with an interruption in the tractive force, i.e., leaving the power-shift clutch disengaged during the synchronization of the engine and transmission, so that the synchronization has to be accomplished through the drag torque of the engine alone.

To reduce the accumulation of energy in the power-shift clutch, it is also possible to lower the preset shift-rpm levels at which the gear-changes are initiated and thereby reduce the slip-rpm rates of the power-shift clutch, especially in the lower gears of the power-shift transmission, where a high influx of energy into the transmission takes place.

The foregoing measures can be applied in a selectively controlled manner depending on the excess temperature over a set limit. However, if the maximum allowable power level of the power-shift clutch is found to be exceeded, it is advantageous to cut back the clutch torque, e.g., to the level of the maximum engine torque, in order to avoid damage to the power-shift clutch.

Figure 3:
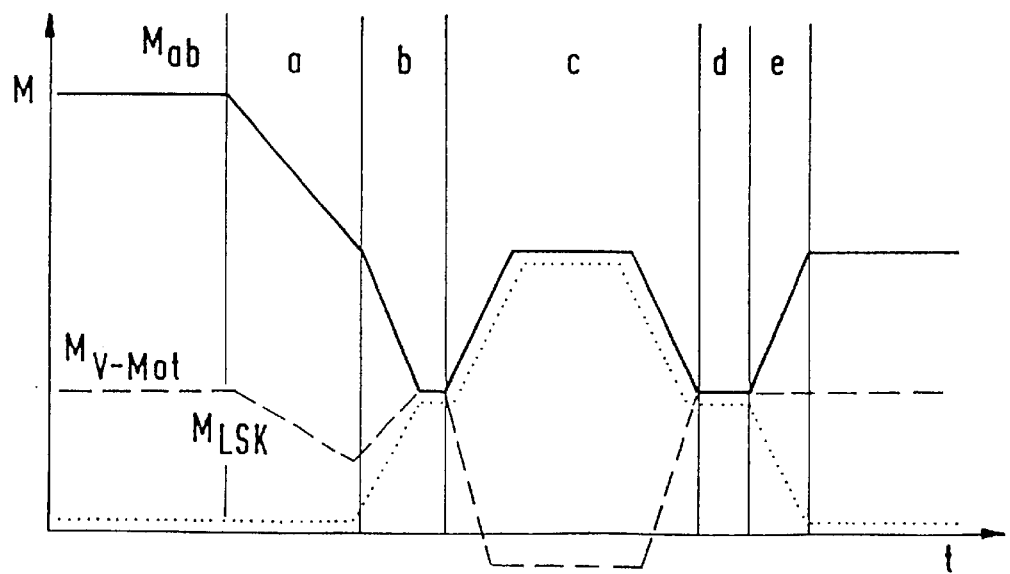
FIG. 3 gives a representation analogous to FIG. 1, showing time profiles according to an alternative embodiment of the inventive method.

FIG. 3 of the drawing illustrates a torque profile that is similar to the profile of FIG. 1, except for the difference that during the synchronization phase, the clutch torque $M_{LSK}$ is raised significantly above the maximum engine torque, so that the increased clutch torque makes an additional active contribution to the deceleration of the engine and thereby helps to shorten the synchronization time, i.e., the time interval for reducing the rpm-difference between the mating elements of the gear stage that is about to be engaged.

To summarize and conclude: The invention provides a method of controlling a gear-changing process, whereby the amount of energy is lowered that is introduced into the frictional slip clutch where it causes an increase in temperature. The influx of energy into the power-shift clutch takes place during the time phases when the power-shift clutch transmits a torque and there is an rpm differential between the friction surfaces of the power-shift clutch. In an up-shift, the power-shift clutch decelerates the engine and transmission input shaft against the drive train of the vehicle. This process of synchronization can be assisted by lowering the engine torque or by controlling the engine in such a manner that the engine is in a drag mode, because in this case, the engine will shorten the synchronization time and thereby reduce the influx of energy into the power-shift clutch. Before and after the synchronization phase of the power-shift transmission, the engine torque and the clutch torque have to be equalized. If the clutch torque has been raised above the maximum engine torque during the synchronization phase, the raising and lowering of the clutch torque has to be performed at a rate that is consistent with set time gradients based on a specified comfort level. The reason for this is that during the synchronization phase, the output torque is determined by the power-shift clutch torque alone and abrupt changes of the clutch torque must therefore be avoided. On the other hand, abrupt changes of the engine torque can clearly be of advantage, i.e., if the engine can rapidly change from traction to drag mode and thereby contribute to a shortening of the synchronization time.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of controlling a gear-shifting process in a power-shift transmission of a vehicle, wherein said power-shift transmission is coupled to an engine and is equipped with a frictional slip clutch, an input shaft and an output shaft, said engine generating an engine torque, said frictional slip clutch transmitting a clutch torque, and said power-shift transmission applying an output torque to a drive train; the method comprising: varying the engine torque and the clutch torque in such a manner that a temperature increase of the frictional slip clutch is reduced in magnitude.

2. The method of claim 1, wherein the gear-shifting process comprises a change from a lower gear to a higher gear of the power-shift transmission while the power-shift transmission continues to transmit tractive power.

3. The method of claim 1, wherein the power-shift transmission comprises gear stages with gear clutches that can be engaged and disengaged; said method comprising: in a beginning phase of the gear-shifting process, lowering the output torque by lowering the engine torque while during said beginning phase a currently engaged gear clutch is kept engaged.

4. The method of claim 3, wherein in said beginning phase the frictional slip clutch transmits substantially no clutch torque.

5. The method of claim 3, further comprising: after said beginning phase, raising the engine torque and the clutch torque until the engine torque and the clutch torque are substantially equal.

6. The method of claim 5, further comprising: retracting the currently engaged gear clutch from engagement when the engine torque and the clutch torque have become substantially equal.

7. The method of claim 5, wherein the gear clutches have actuators and the actuator of the currently engaged gear clutch applies a retracting force to the currently engaged gear clutch before the engine torque and the clutch torque have become substantially equal.

8. The method of claim 3, further comprising: synchronizing a gear stage that is about to be engaged by varying the engine torque.

9. The method of claim 8, further comprising: varying the clutch torque in such a manner that the output torque is made equal to a subsequent output torque that will be present after the gear-shifting process.

10. The method of claim 8, further comprising:
shortening a time interval required for said synchronization by setting the engine into a drag mode.

11. The method of claim 8, further comprising:
shortening a time interval required for said synchronization by raising the clutch torque to a higher level than a maximum engine torque, whereby an rpm rate of the engine and of the input shaft is lowered.

12. The method of claim 8, further comprising: when said gear stage is substantially synchronized, setting the clutch torque and the engine torque to substantially equal values.

13. The method of claim 8, further comprising: bringing said gear stage into engagement when the input shaft and the output shaft have substantially equal rpm rates and accelerations.

14. The method of claim 1, further comprising: taking the frictional slip clutch out of engagement after the gear-changing process.

15. The method of claim 1, further comprising:
monitoring the temperature of the frictional slip clutch in order to avoid a heat overload.

16. The method of claim 15, further comprising: if said temperature is found to be too high, lowering the clutch torque to an extent that depends on said temperature.

17. The method of claim 15, further comprising: if said temperature is found to be too high, lowering the output torque during synchronization.

18. The method of claim 15, further comprising: if said temperature is found to be too high, preventing the power-shift transmission from down-shifting into first gear.

19. The method of claim 15, further comprising: if said temperature is found to be too high, keeping the frictional slip clutch in a disengaged state during synchronization.

20. The method of claim 15, further comprising: if said temperature is found to be too high, lowering preset rpm rates for the initiating of gear changes.

21. The method of claim 1, further comprising:
monitoring an amount of power transmitted through the frictional slip clutch and, if the amount of power is found to be too high, lowering the clutch torque.

22. The method of claim 21, further comprising: if the amount of power is found to be too high, lowering the clutch torque to an amount that equals a maximum torque of the engine.

* * * * *